United States Patent
Ma

(10) Patent No.: US 6,330,130 B1
(45) Date of Patent: *Dec. 11, 2001

(54) DISK CARTRIDGE WITH FUZZED LINER HAVING ROUGH FIBERS

(75) Inventor: Yiping Ma, Layton, UT (US)

(73) Assignee: Iomega Corporation, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/605,346

(22) Filed: Jun. 28, 2000

Related U.S. Application Data

(63) Continuation-in-part of application No. 09/021,501, filed on Feb. 10, 1998, now Pat. No. 6,148,495, which is a division of application No. 08/613,880, filed on Mar. 11, 1996, now Pat. No. 6,185,803, which is a continuation of application No. 08/681,095, filed on Jul. 22, 1996, now Pat. No. 5,677,818, which is a continuation of application No. 08/324,579, filed on Oct. 18, 1994, now abandoned.

(51) Int. Cl.[7] .................................................. G11B 23/03
(52) U.S. Cl. ............................. 360/133; 369/291
(58) Field of Search ........................... 369/291; 360/133; 206/308.1, 308.3, 313; 29/419.1

(56) References Cited

U.S. PATENT DOCUMENTS

| | | | |
|---|---|---|---|
| 5,122,919 | * | 6/1992 | Takemae et al. ..................... 360/133 |
| 5,311,389 | * | 5/1994 | Howey ................................ 360/133 |
| 5,398,151 | * | 3/1995 | Swanson et al. .................... 360/133 |
| 5,677,818 | * | 10/1997 | Ma et al. ............................. 360/133 |

FOREIGN PATENT DOCUMENTS

| | | | |
|---|---|---|---|
| 0 399 110 A1 | * | 11/1990 | (EP) . |
| 0 854 484 A1 | * | 7/1998 | (EP) . |
| 62-164283 | * | 7/1987 | (JP) . |
| 96/12282 | * | 4/1996 | (WO) . |

* cited by examiner

Primary Examiner—William Klimowicz
(74) Attorney, Agent, or Firm—Woodcock Washburn LLP

(57) ABSTRACT

A disk cartridge includes a rotatable disk having upper and lower surfaces and an outer casing for rotatably housing the disk. The casing includes upper and lower shells which have a non-woven fabric polyester liner with round fibers having rough, irregular, diameters. The rough surface of the fibers makes the liner more compliant and thus less abrasive to the disk. The round fibers have irregular variation in diameter of 10% to 50% with variations of about 25% being preferable.

10 Claims, 7 Drawing Sheets

DISK CARTRIDGE WITH FUZZED LINER HAVING ROUGH FIBERS

CROSS-REFERENCE TO RELATED APPLICATIONS

This application is a continuation-in-part of application of Ser. No. 09/021,501 filed Feb. 10,1998, now U.S. Pat. No. 6,148,495, which is a divisional of Ser. No. 06/613,880 filed Mar. 11, 1996 now U.S. Pat. No. 6,185,803, which is a continuation of 08/681,095 filed Jul. 22, 1996, now U.S. Pat. No. 5,677,818 issued Oct. 10, 1997 which is a continuation of Ser. No. 08/324,579 filed Oct. 18, 1994, now abandoned.

FIELD OF THE INVENTION

The present invention relates to disk cartridges for storing electronic information, and more particularly, to a disk cartridge having an improved fabric liner.

DESCRIPTION OF THE PRIOR ART

Removable disk cartridges for storing digital electronic information typically comprise an outer casing or shell that houses a magnetic, magneto-optical or optical disk upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge at a given speed. The outer shell of the cartridge typically has an aperture near one edge to provide access to the disk. A shutter or door mechanism is often provided to cover the aperture when the cartridge is not in use to prevent dust or other contaminants from entering the cartridge and settling on the recording surface of the disk.

Although the cartridge shell and shutter mechanism provide some protection against contaminants entering the cartridge, some contaminants will inevitably reach the recording surface of the disk. For example, dust, smoke and other debris may enter the cartridge through the disk hub or through the cartridge shutter when the disk is inserted in a disk drive. Additionally, magnetic particles may be generated during manufacturing of the disk cartridge as well as during read/write operations in the disk drive. These contaminants can interfere with a read/write head causing errors and a potential loss of information.

To reduce the risk of read/write errors resulting from particles on the disk surface, cartridge often include one or more fabric liners within the cartridge in contact with the disk surface.

U.S. Pat. No. 5,667,818, Ma et al., issued on an application from which a divisional application is the parent hereof. It describes a non-woven fabric liner which has been fuzzed to loosen fibers in a region which contacts the surface of the disk. The upstanding fibers wipe the surface of the disk while the main body of the liner remains spaced from the disk thereby reducing drag. A second non-woven fabric liner is attached to the inner surface of the other of the shells.

Making the liner more compliant and less abrasive to the disk and making the liner more abrasion resistant to protect itself, lead to improved performance of the disk cartridge system.

SUMMARY OF THE INVENTION

In accordance with the present invention an improved liner for a disk cartridge includes a polyester material having round fibers which vary in diameter along the length of the fibers. The rough surface of the polyester fiber makes the liner more compliant and less abrasive to the disk. Because of the variations in diameter along the length of the fiber, the liner is more abrasion resistant which protects the liner. This new liner provides greatly improved performance when compared with cartridges having liners made of prior material.

The foregoing and other objects, features, and advantages will be better understood from the following more detailed description and appended claims.

SHORT DESCRIPTION OF THE DRAWINGS

DETAILED DESCRIPTION OF THE PREFERRED EMBODIMENT

Figure 1:
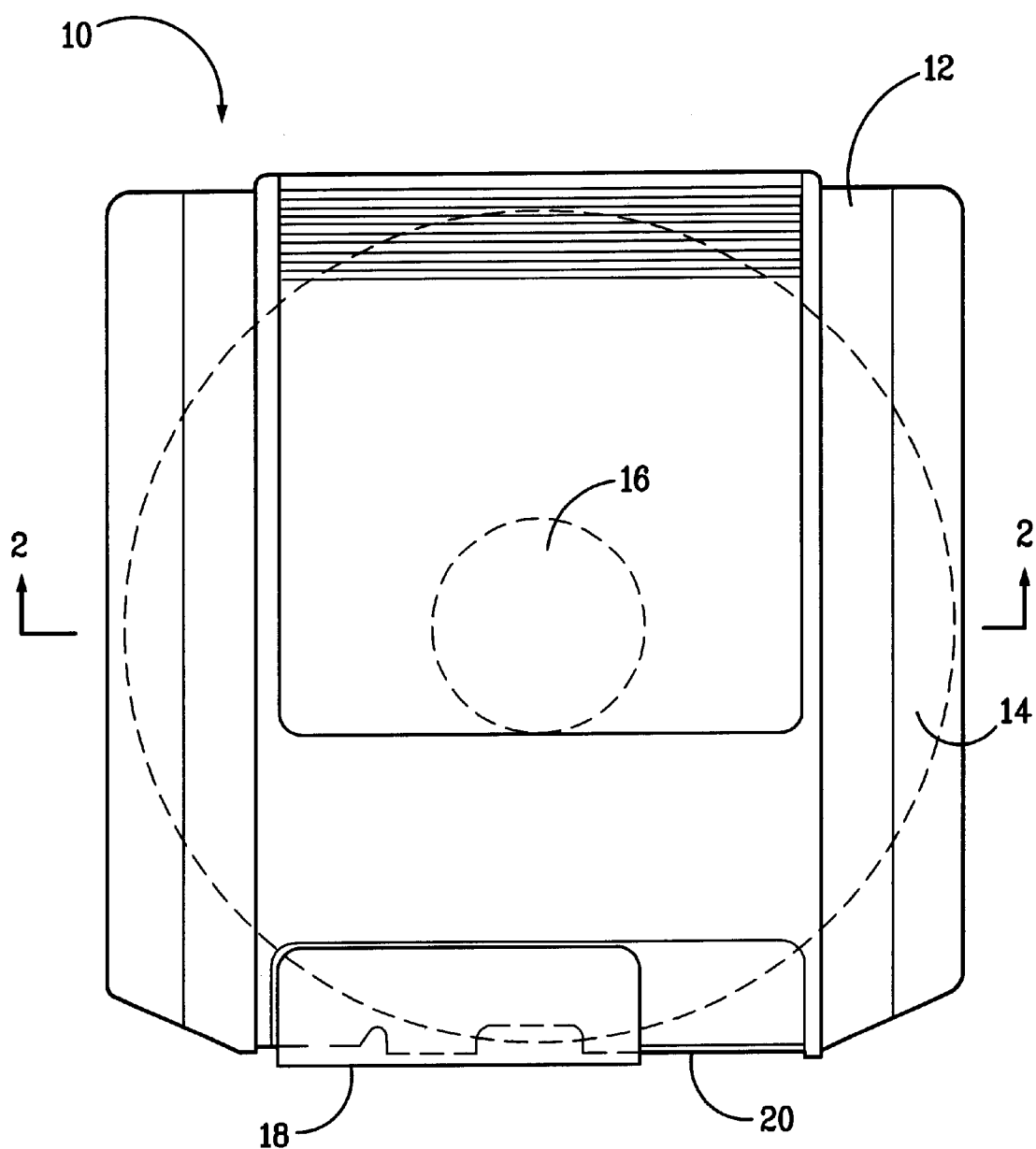
FIG. 1 is a top view of a disk cartridge according a preferred embodiment of the present invention.

Referring to the drawings wherein like numerals indicate like elements throughout, there is shown in FIGS. 1–4 a prior art disk cartridge 10 comprising an outer casing 12 and a disk 14 having a hub 16 rotatably mounted in the casing 12. The casing 12 comprises upper and lower shells (FIGS. 3 & 4) that mate to form the casing. A shutter 18 is provided on the cartridge to cover an aperture (not shown) in the front edge 20 of the casing. When the cartridge is inserted into a disk drive (not shown), the shutter moves to the side exposing the aperture and thereby providing the read/write heads of the drive with access to the recording surface of the disk 14. In the present embodiment, the disk 14 comprises a flexible or floppy magnetic disk, however, in other embodiments, the disk may comprise a rigid magnetic disk, a magneto-optical disk or an optical storage medium. The magnetic disk 14 is formed of a thin (e.g. 0.0025 inches), flexible, circular base of polymeric film. Each side of the flexible disk is coated with a layer of magnetic recording material to form upper and lower recording surfaces.

Figure 2:
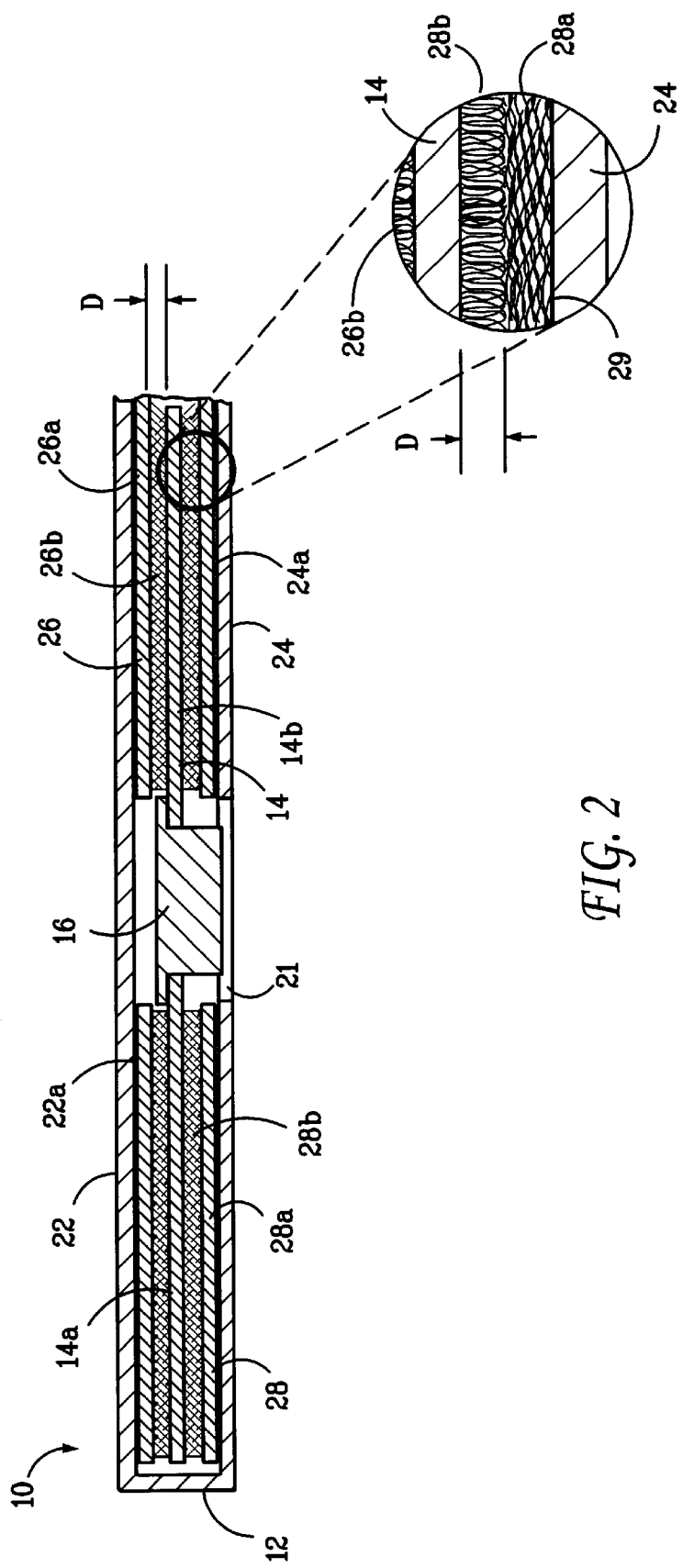
FIG. 2 is a sectional view of the cartridge of FIG. 1 taken along line 2—2 of FIG. 1.

Referring to FIG. 2, in greater detail, the upper shell 22 of the outer casing 12 has an inner surface 22a disposed in facing relation to the upper side 14a of the rotatable disk 14. Similarly, the lower shell 24 has an inner surface 24a disposed in facing relation to the lower surface 14b of the disk 14. As further shown, a circular cutout 21 is formed in the lower shell 24 to provide access to the disk hub 16. Preferably, the inner surfaces 22a, 24a of the upper and lower shells 22, 24 are substantially planar.

A first non-woven fabric liner 26 is attached to the inner surface 22a of the upper shell 22. The liner 26 is formed of a mixture of non-woven fibers bonded together in any well known manner, such as thermally, with an adhesive binder, or through a hydroentangling process. As used herein and in the claims, the term "bonded" is intended to cover all such possibilities. In the cartridge of U.S. Pat. No. 5,677,818, the liner 26 is formed of a mixture of rayon (80%) and nylon (20%) fibers. One fabric liner which has been used is "DataProtech Liner", available from Veratec Data Resources Group, 100 Elm Street, Walpole, MA 02081-1898. The "DataProtech Liner" has a standard weight of 30.0 GSY, a nominal thickness of 7.8 mils, and a standard dry "MD" tensile strength of 5.0 lb/in.

When the fabric liner 26 is affixed to the inner surface 22a of the upper shell 22, the main body 26a of the liner is spaced from the disk, in facing relation thereto, a predetermined distance, D. The main body 26a of the liner does not contact the upper surface 14a of the disk 14. Preferably, the predetermined distance, D, is in the range of 0.2 to 0.8 mm. The predetermined distance, D, is approximately 0.5 mm.

A region of the fabric liner is subjected to a fuzzing process (described in U.S. Pat. No. 5,677,818) in which some of the bonded fibers in that region are loosened to form a region of upstanding fibers 26b that extend from the main body 26a of the liner to the surface 14a of the disk 14, as shown in FIG. 2. The upstanding fibers 26b contact the surface 14a of the disk and wipe any undesirable contaminants from the disk surface 14a as the disk 14 rotates in the casing 12. The main body 26a of the liner 26, however, remains spaced from the surface of the disk. With only the upstanding fibers 26b contacting the surface of the disk, drag on the disk is extremely low. Additionally, the upstanding fibers 26 wipe the disk without the need for conventional lifters and/or ribs to press the liner against the disk surface. Accordingly, the cartridge 10 of the present invention requires less components and is easier to manufacture. As can be appreciated, the upstanding fibers resulting from the fuzzing process must extend from the main body of the liner at least a distance equal to the predetermined spacing, D.

As further shown in FIG. 2, a second fabric liner 28, which may be identical to the first liner 26, is attached to the inner surface 24a of the lower shell 24. Like the first liner 26, the second liner 28 has a region of upstanding fibers 28b which extend from the main body 28a of the liner 28 to the lower surface 14b of the disk 14. The upstanding fibers 28b of the second liner 28 function identically to those of the first liner. The enlarged cross-sectional view of a portion of the second liner 28 provides further detail illustrating the bonded fibers of the main body 28a of the liner, as well as the upstanding fibers 28b resulting from the fuzzing of the liner in accordance with the present invention. It has been found that use of the opposing fuzzed liners in accordance with the preferred embodiment of the present invention has a tendency to stabilize the disk 14 during high speed rotation (e.g., 3600 rpm). Stabilization of the rotating media is desirable. Additionally, because the upstanding fibers are not densely packed together, they can also serve to filter the air within the cartridge.

The first and second liners 26, 28 are attached to the respective planar surfaces 22a, 24a of the upper and lower shells 22, 24 using an adhesive 29. Specifically, an adhesive that cures under exposure to ultra-violet light is printed on the inner surfaces 22a, 24a of the upper and lower shells 22, 24 using conventional pad printing technologies with a flat transfer pad. The liners 26, 28 are then placed on the respective shell surfaces 22a, 24a.

Figure 3:
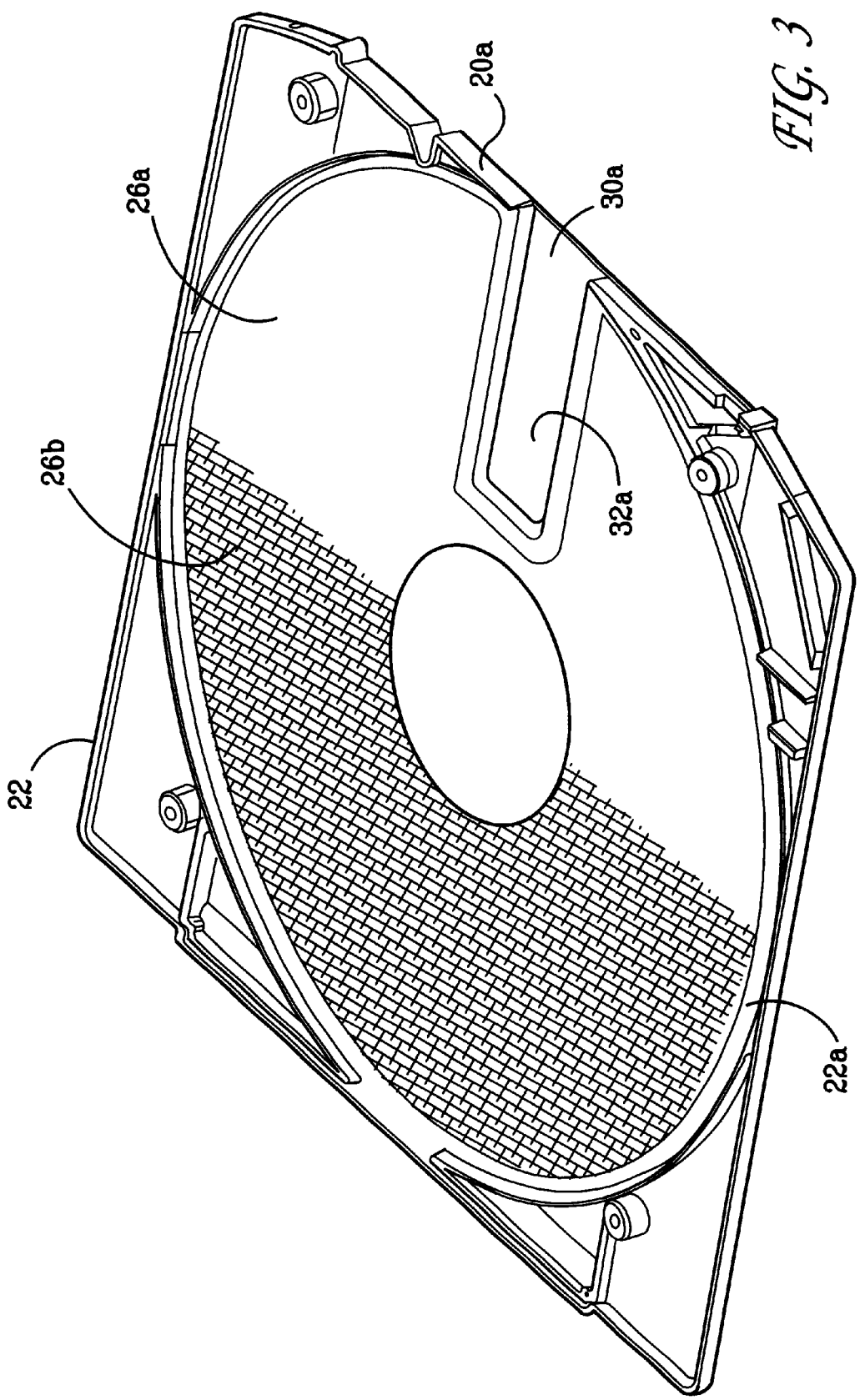
FIG. 3 is a perspective view of a fabric liner affixed to the inner surface of the lower shell of the cartridge of FIG. 1 and illustrates a fuzzed region of the liner.
Figure 4:
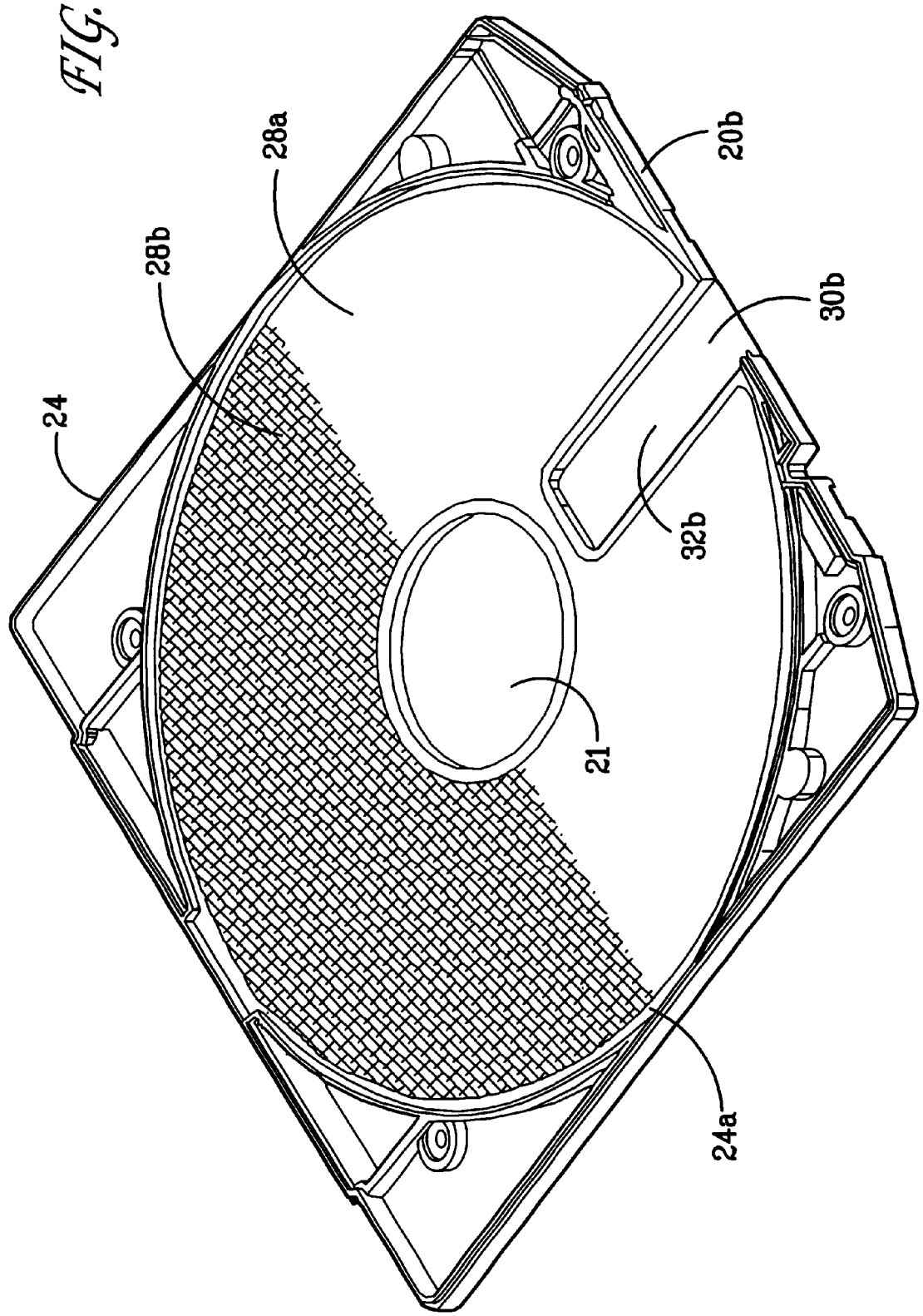
FIG. 4 is a perspective view of a fabric liner affixed to the inner surface of the upper shell of the cartridge of FIG. 1.

FIGS. 3 and 4 show further details of the inner surfaces 22a, 24a of the upper and lower shells 22, 24, respectively. As shown in FIG. 3, the inner surface 22a of the upper shell 22 is substantially planar, and the main body 26a of the first fabric liner 26 is affixed to the inner surface 22a of the upper shell 22 so that it lies substantially flat against the planar surface 22a. An opening 30a is provided in the front edge 20a of the upper shell 22, and a groove 32a is formed in the upper shell 22 that extends from the opening 30 toward the center of the shell 22.

As shown in FIG. 4, the inner surface 24a of the lower shell 24 is also substantially planar, and the main body 28a of the second fabric liner 28 is affixed to the inner surface 24a of the lower shell 24 so that it too lies substantially flat against the planar surface 24a. As further shown, the lower shell 24 includes an opening 30b and a groove 32b similar to that formed in the upper shell 22. A circular opening 21 in the lower shell 24 provides access to the hub 16 of the disk 14.

The opening 30a and groove 32a in the upper shell 22a cooperate with the opening 30b and groove 32b in the lower shell to provide the magnetic heads (not shown) of a disk drive with access to the recording surface(s) of the disk 14. As FIGS. 3 and 4 illustrate, according to an important feature of the cartridge 10 of the present invention, there is no aperture or opening in either the upper or lower shell surfaces. Rather, the grooves 32a, 32b form a closed channel within the cartridge. The only aperture through which the magnetic heads of a disk drive can enter the cartridge is that formed on the front edge 20 of the cartridge 10 by the respective openings 30a and 30b. By providing an aperture only in the front edge 20 of the cartridge, the risk of contaminants entering the cartridge and reaching the recording surface of the disk 14 is reduced.

FIGS. 3 and 4 further illustrate the sizes and shapes of the fuzzed regions 26b, 28b (shaded portions) of the first and second liners 26, 28. As shown, in the preferred embodiment, the fuzzed regions 26b, 28b of each liner 26, 28 occupy approximately fifty percent (50%) of the liner surface area.

Figure 5:
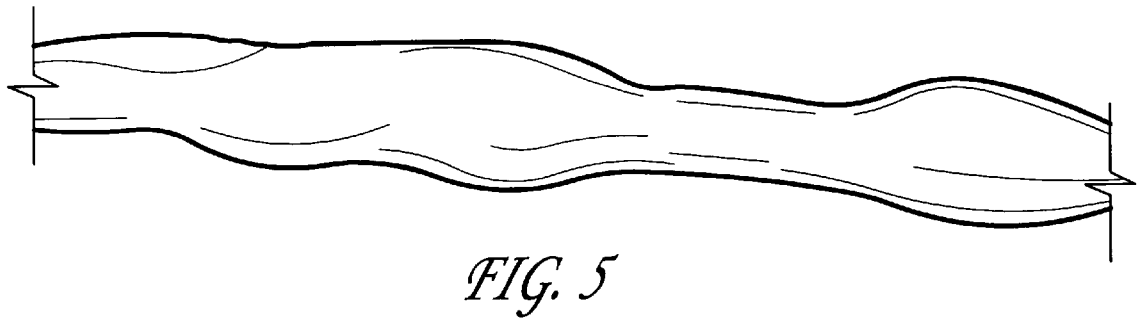
FIG. 5 is a close up view of a polyester fiber in accordance with the present invention.
Figure 6:
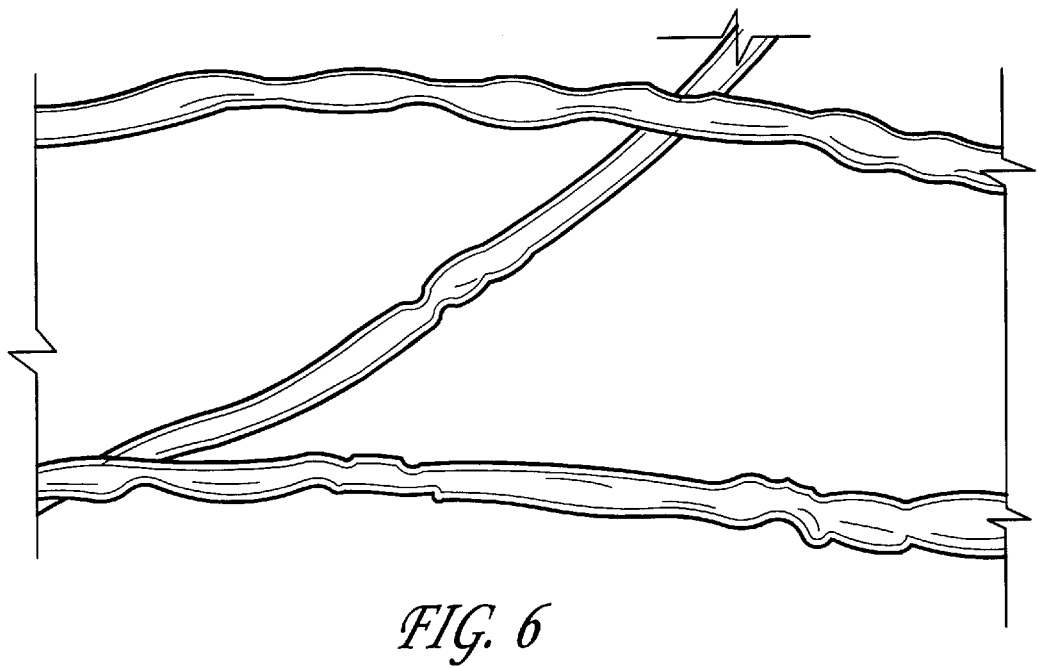
FIG. 6 shows a liner in accordance with the invention.

In accordance with the present invention the liner 28 is a polyester material which has unique characteristics which give the disk cartridge improved operating characteristics. The fibers of the liner of the present invention are shown in FIGS. 5 and 6. The single fiber of FIG. 5 is round and has a diameter of approximately 12 microns. The round fibers vary in diameter along the length of each fiber. As shown in FIG. 5, the fiber has a reduced diameter in the region 30 which is approximately 9 microns in diameter. These reductions in diameter appear irregularly over the fiber lengths as is shown in FIG. 6.

The reductions in diameter are preferably approximately 25%. Reduction in the range of approximately 10% to approximately 50% produce improved results.

Figure 7:
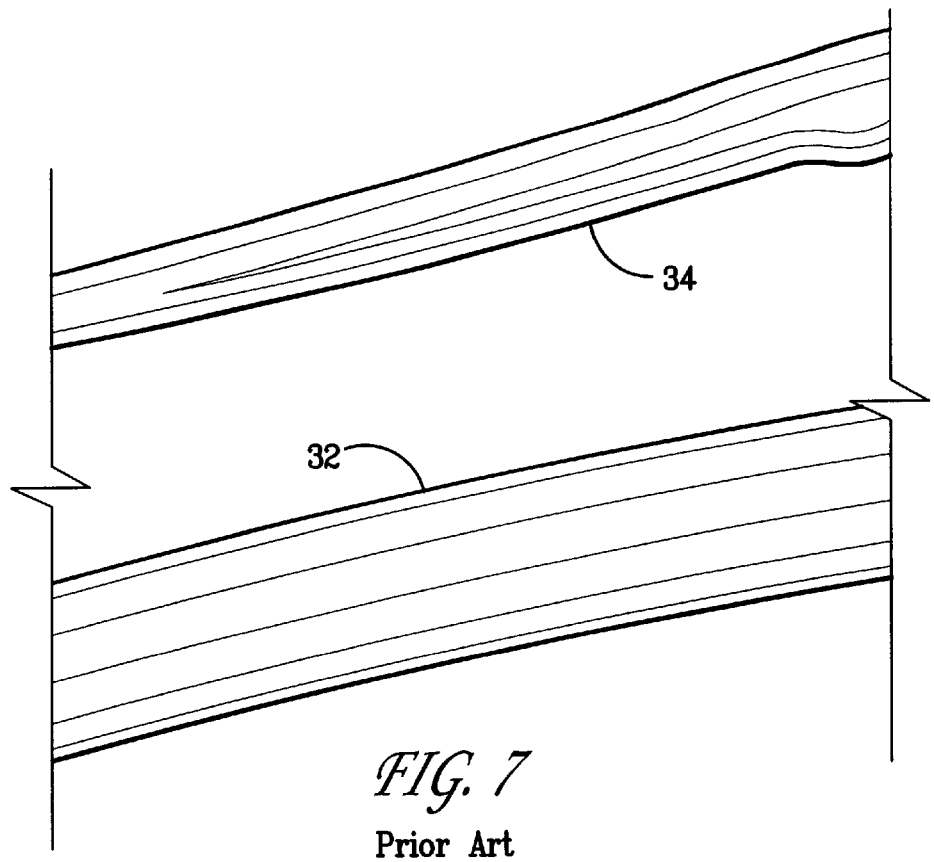
FIG. 7 shows a prior art rayon fiber next to a prior art polyester fiber.

FIG. 7 shows a regular polyester fiber 32 next to a rayon fiber 34. The polyester fiber is relatively smooth as is the rayon fiber. Moreover, the rayon fiber is not circular in cross-section.

Figure 8:
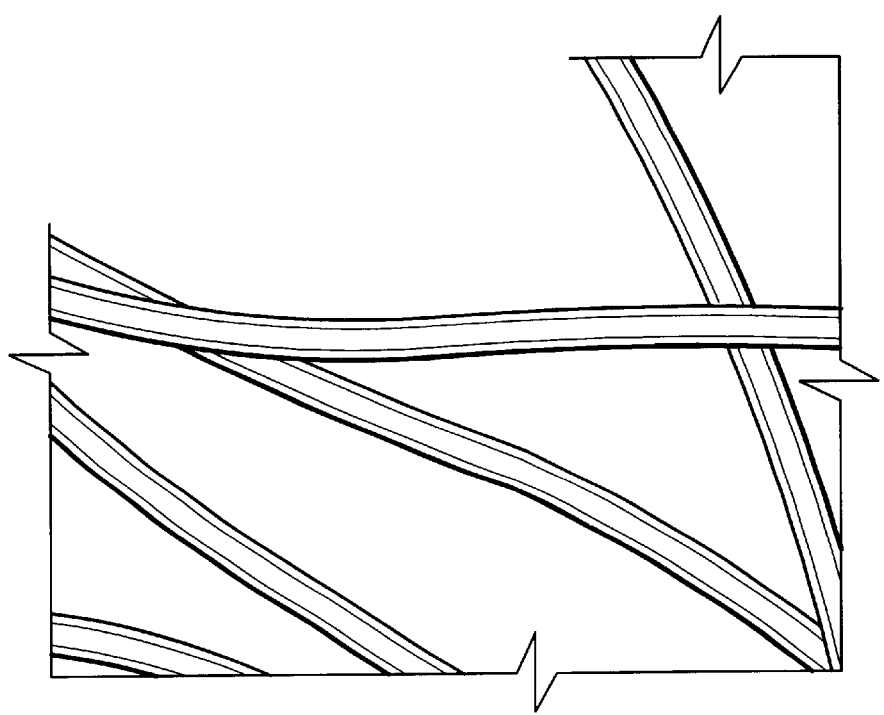
FIG. 8 shows a prior art polyester fiber.

FIG. 8 depicts the normal polyester fiber which is typically used as liner material.

Figure 9:
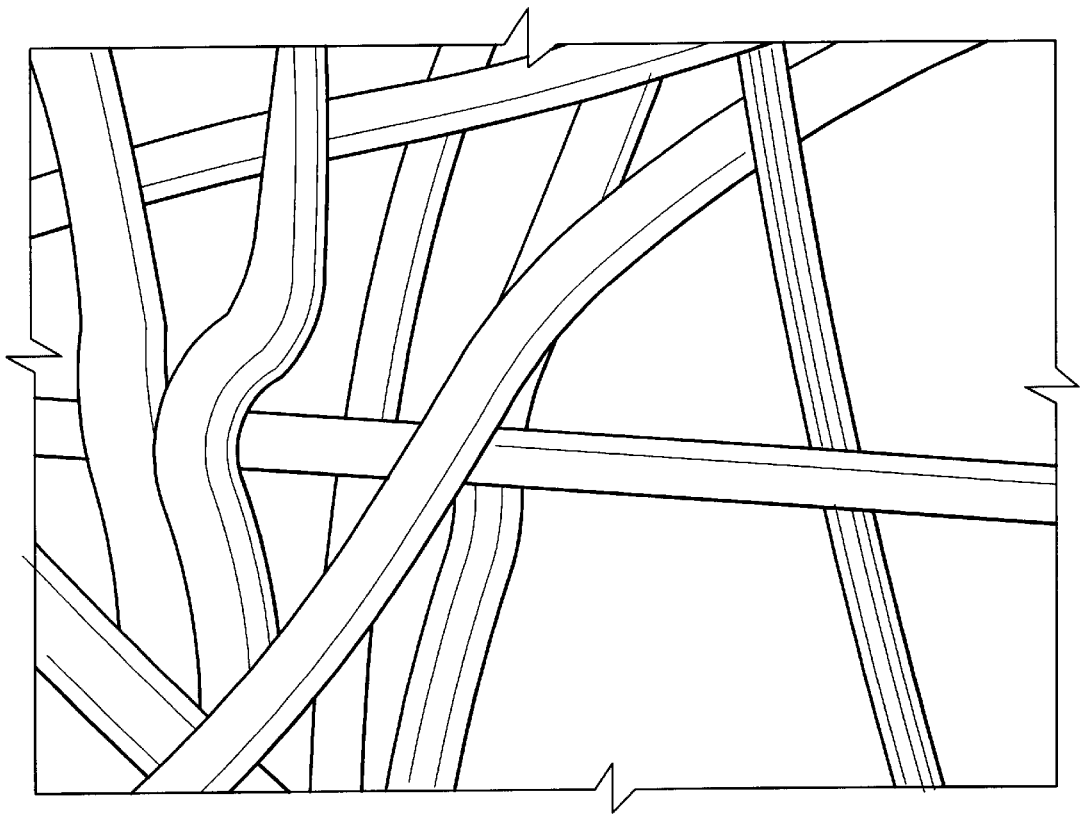
FIG. 9 shows a prior art rayon fiber.

FIG. 9 depicts rayon fiber which has been used as disk liner material.

The following tests and results show the improved operating characteristics which have been obtained with polyester liner material having fibers which are round and have irregularities as shown in FIGS. 5 and 6. The test which is performed where the interaction between liner and the disk is maximized is called the Spin-up-Spin-down test. In this particular test the drive will spin up to the operational speed.

After the drive reaches the steady operating speed, the recording head will access a random location on the disk before parking again. The drive will then spin down to zero rpm. Since the disk is flexible in this case, substantial contact between the disk and the liner occurs during the spin-up-spin-down cycle. The interaction between the prior art polyester liner and disk will produce a substantial amount of contamination on the disk surface which could lead to increased error rate. Similar testing done with the liner made with rough polyester in accordance with the present invention, however, produces no or very slight contamination of the disk surface.

The table below summarizes the visual inspection result at the end of a comparative Spin-up-Spin-down test between the two liner types. Clearly, the liner in accordance with its present invention is much better in comparison to the prior art polyester liner.

| Sample | Liner Type | Ranking of Contamination |
| --- | --- | --- |
| 1 | Prior Art | 8 |
| 2 | Prior Art | 9 |
| 3 | Prior Art | 8 |
| 4 | Prior Art | 8 |
| 5 | Prior Art | 7 |
| average | | 8 |
| 6 | Per Invention | 0 |
| 7 | Per Invention | 1 |
| 8 | Per Invention | 1 |
| 9 | Per Invention | 0 |
| 10 | Per Invention | 0 |
| Average | | 0.4 |

A particular embodiment has been shown and described but various modifications are within the true spirit and scope of the invention. The appended claims cover all such modifications.

What is claimed is:

1. In a disk cartridge comprising:

a rotatable disk having upper and lower surfaces:

an outer casing for rotatably housing said disk, said casing comprising upper and lower shells that mate to form said casing, each of said upper and lower shells having an inner surface disposed in facing relation to a respective surface of said disk; and a non-woven fabric liner comprising a plurality of fibers, said fabric liner being attached to the inner surface of one of said upper and lower shells, a main body of said fabric liner lying against the inner surface of said one shell and being spaced a predetermined distance from the respective surface of said disk, the improvement wherein said liner is a polyester material having round fiber which vary in diameter along the length of each fiber; wherein said fibers are bonded, the bonds between a plurality of fibers in a region of the liner being loosened by a fuzzing process to create a region of loosened unbonded upstanding fibers, wherein some of said loosened unbonded upstanding fibers are individually unbonded from other fibers and the loosened unbonded upstanding fibers extend from the main body of said liner to the surface of said disk, whereby said loosened unbonded upstanding fibers wipe the surface of said disk while the main body of the liner remains spaced from said disk thereby reducing drag on said disk.

2. The disk cartridge recited in claim 1 wherein said fibers have a variation in diameter up to 50%.

3. The disk cartridge recited in claim 2 wherein said variation in diameter is from about 10% to about 50%.

4. The disk cartridge recited in claim 2 wherein said variation in diameter is about 25%.

5. The disk cartridge recited in claim 1 wherein the fibers of said liner have a rough surface.

6. The disk cartridge recited in claim 5 wherein said rough surface of the said fibers make said liner more compliant and less abrasive to said disk, and more abrasion resistant.

7. The disk cartridge recited in claim 1 further comprising:

a second non-woven fabric liner comprising a plurality of bonded fibers, said second fabric liner being attached to the inner surface of the other of said upper and lower shells, a main body of said second fabric liner lying against the inner surface of said other shell and being spaced a predetermined distance from the respective surface of said disk, said second fabric liner having a fuzzed region of upstanding fibers that extend from the main body of said second fabric liner to the surface of said disk.

8. The disk cartridge recited in claim 7 wherein said predetermined distance is the range of 0.2 to 0.8 mm.

9. The disk cartridge recited in claim 1 wherein said fabric liner is attached to the inner surface of said one shell by an adhesive.

10. The disk cartridge recited in claim 1 wherein the inner surfaces of said upper and lower shells are substantially planar.

* * * * *